United States Patent [19]

Klinkner et al.

[11] Patent Number: 4,685,698

[45] Date of Patent: Aug. 11, 1987

[54] APPARATUS FOR THE ROAD-SURFACE-DEPENDENT CONTROL OF SHOCK ABSORBERS IN A VEHICLE SUSPENSION SYSTEM

[75] Inventors: Walter Klinkner, Stuttgart; Fritz Schmidt, Waiblingen, both of Fed. Rep. of Germany

[73] Assignee: Daimler-Benz Aktiengesellschaft, Fed. Rep. of Germany

[21] Appl. No.: 866,377

[22] Filed: May 23, 1986

[30] Foreign Application Priority Data

May 23, 1985 [DE] Fed. Rep. of Germany ....... 3518503

[51] Int. Cl.$^4$ ............................................. B60G 17/04
[52] U.S. Cl. ...................................... 280/707; 188/299
[58] Field of Search .............................. 188/285, 299; 267/64.18, 64.22, 64.28; 280/707

[56] References Cited

U.S. PATENT DOCUMENTS

| | | | |
|---|---|---|---|
| 4,596,320 | 6/1986 | Shimokura et al. | 188/299 |
| 4,600,215 | 7/1986 | Kuroki et al. | 280/707 |
| 4,634,142 | 1/1987 | Woods et al. | 280/707 |

Primary Examiner—Duane A. Reger

[57] ABSTRACT

Apparatus for controlling a vehicle suspension system includes acceleration sensors mounted on the vehicle for producing electrical signals representative of road surface undulations or irregularities, processing circuitry for processing the sensor signals to produce control signals, and a shock absorber or damper having adjustable damping characteristics. The damper preferably includes two chambers connected by a controllable bypass. One of the chambers becomes smaller during compression of the suspension system, and one becomes smaller during expansion. A controllable throttle and/or valve is provided in the bypass to adjust the damping characteristic of the absorber. The circuitry produces control signals H and w which are representative of the average height of the overall road surface undulations, and a ratio of average heights of long-wave and short-wave undulations, respectively. The circuitry further processes these signals to produce control signals F and P to control the bypass throttle and/or valve, respectively, in accordance with the following relationship:

$$P = a_0 + a_1 H + a_2 w + a_3 H w$$

$$F = b_0 + b_1 H + b_2 w + b_3 H w$$

where, $a_0 - a_3$ and $b_0 - b_3$ are predetermined constants.

11 Claims, 7 Drawing Figures

APPARATUS FOR THE ROAD-SURFACE-DEPENDENT CONTROL OF SHOCK ABSORBERS IN A VEHICLE SUSPENSION SYSTEM

BACKGROUND AND SUMMARY OF THE INVENTION

This invention relates to apparatus for the road-surface-dependent control of shock absorbers of a vehicle suspension system. The apparatus includes sensors which are attached to the vehicle and which emit electrical signals which are characteristic of the undulations or unevenness of a road surface, and an evaluating circuit which receives the sensor signals and generates actuating signals for controlling the damping characteristics of the shock absorbers. The actuating signals generated are representative of the average heights of the long-wave and short-wave undulations of the road surface. The shock absorbers have at least two chambers which communicate via a controllable bypass, one of which becomes smaller during compression of the suspension system and the other of which becomes smaller during expansion of the suspension system. The controllable bypass includes throttle and/or valve devices which have respectively, a controllable throttle cross-section and/or controllable valve closing pressures which are controlled by the actuating signals produced by the evaluating circuit.

In a device described in corresponding unpublished European patent application No. 01 51 421, the road surface is scanned with an ultrasonic sensor, the electrical output signals of which correspondingly represent the road-surface undulations. The output signals are supplied in parallel to a high-pass and low-pass filter which are in each case followed by a rectifier. Accordingly, the output of the rectifier following the low-pass filter represents a measure of the long-wave unevennesses of the road surface, whereas the level of the output of the rectifier following the high-pass filter is a measure of the short-wave road-surface unevennesses. The shock absorbers of the suspension system can be switched between a soft and a hard or firm operating mode. This is carried out in dependence on whether the level of the output of the rectifier following the low-pass filter exceeds or drops below the level of a reference signal. If the level of this output is above the reference level, the shock absorbers are switched to the hard operating mode, i.e., to high damping. The output of the rectifier following the high-pass filter then influences the level of the reference signal in such a manner that the reference level is increased if the output level of this rectifier increases.

In German Offenlegungsschrift No. 2,441,172, a device is shown which operates with sensors for sensing the acceleration of the vehicle body and the distance between wheel or wheel support and vehicle body. In this arrangement, the shock absorbers are controlled in accordance with the magnitudes of this acceleration and distance, so that the actual acceleration of the body is adjusted toward a nominal value which depends on the magnitude of the distance.

In British Patent Specification No. 1,604,416, a system having hydropneumatic support units is described. These are controlled in dependence on the signals from sensors for the hydraulic pressure and sensors for the relative speed between the wheel or axle and the body. This creates the possibility of controlling the damping of the hydropneumatic support units in accordance with a predeterminable relation between pressure and speed, which is not described in detail in British Patent Specification No. 1,604,416.

German Offenlegungsschrift No. 3,426,014 describes a device having acceleration sensors at the body and at the wheel supports. The signals from these sensors are processed in a digital circuit which controls the shock absorbers of the vehicle suspension. In this arrangement, particularly low damping is achieved when the wheel and body are moving in the same direction, i.e., are subject to acceleration in the same direction. This is particularly desirable if, at the same time, the speed of the wheel axle is greater than that of the body because the movement of the body would be additionally excited in these vibration phases if the damping is too great.

An object of the present invention is to provide apparatus for the road-surface-dependent, electronically-aided control of shock absorbers of a vehicle suspension in such a way that the shock absorbers can be optimally adjusted under virtually all conceivable driving conditions, particular attention being paid to whether and to what extent vibrations are excited in the range of body and/or axle resonance by road-surface undulations.

This and other objects are attained in an apparatus which preferably includes acceleration sensors for producing signals representative of the road surface undulations, circuitry for processing these signals into control signals, and dampers or shock absorbers having a damping characteristic which can be controlled by these control signals. The control signals generated preferably include: a first signal (h) which is representative of the average height of all road surface undulations; and a second signal (w) which represents the ratio of average heights of long-wave undulations to short-wave undulations. The circuitry processes these control signals to produce at least one of a third (F) and fourth (P) type of control signal in accordance with the following relationships:

$$P = a_o + a_1 H + a_2 w + a_3 H w$$

$$F = b_o + b_1 H + b_2 w + b_3 H w$$

where, $a_o - a_3$ and $b_o - b_3$ are predetermined constants. These signals are applied to controllable elements in the dampers to provide for a harder or softer damping characteristic, depending upon road and driving conditions.

This invention makes possible, with regard to small body movements, a relatively strong damping which is desirable for vibrations in the range of body resonance, and weak damping which is desirable in the case of vibrations in the range of axle resonance. If vibrations in the range of body resonance are greatly predominant, the measure of waviness w is large. If vibrations in the range of axle resonance are predominant, the waviness w has a small value. According to the present invention, the shock absorbers are adjusted to become harder or softer according to the rising or dropping level of waviness in that the throttle cross-section or the valve closing pressure, or preferably both, are adjusted to produce harder damping (narrowed throttle cross-section, increased closing pressure) or softer damping (enlarged throttle cross-section, reduced closing pressure). In this regard, a particular advantage of the invention lies in the fact that the closing pressure also depends on the product of the average height of the road-surface undulations and on the waviness, i.e., the ratio between long-wave and short-wave road-surface undulations.

To determine, on the one hand, the height of the road-surface undulations and to generate a signal representative of this height and, on the other hand, to determine the waviness and provide corresponding signals, acceleration sensors are arranged, in a preferred embodiment of the invention, at the body and at a wheel support or a wheel axle. The output signals of these sensors are additively combined with each other and with the second integral of the output signal of the acceleration sensor arranged at the wheel support or the wheel axle to generate a signal which is representative of the height of the road-surface unevenness over which the vehicle has instantaneously passed. From these output signals, which are successive in time and representative of the heights of the road-surface undulations, signals corresponding to the average height and to the waviness of the road-surface undulations are formed by the electronic circuitry.

In the preferred arrangement, the signals from the sensors are preferably exponentially averaged by the signal processing circuitry and are further processed, via a parallel high-pass filter, which passes the frequency range of the axle resonance of the vehicle, and a parallel low-pass filter, which passes the frequency range of the body resonance, to form the signal corresponding to the waviness. The output signals of the high and low-pass filters are also exponentially averaged and are then combined with each other in a dividing operation.

In this connection, it is appropriate if, for exponentially forming the mean or average, the corresponding signals are in each case supplied to a squaring stage, the output of which is connected via an input resistance to an input of a summing amplifier. The second input of this summing amplifier is feedback-connected to the output by a resistance which is slightly larger than the input resistance. The summing amplifier is followed by a root-extracting stage.

To provide the capability of rapid response to changing road-surface conditions, the acceleration sensor associated with the wheel support or wheel axle is preferably arranged close to the right-hand front wheel when driving on the right and close to the left-hand front wheel when driving on the left.

Furthermore, the acceleration sensor arranged at the body should be arranged in the front area of the vehicle.

Other objects, advantages and novel features of the present invention will become apparent from the following detailed description of the invention when considered in conjunction with the accompanying drawings.

BRIEF DESCRIPTION OF THE DRAWNGS

DETAILED DESCRIPTION OF THE DRAWINGS

Figure 1:
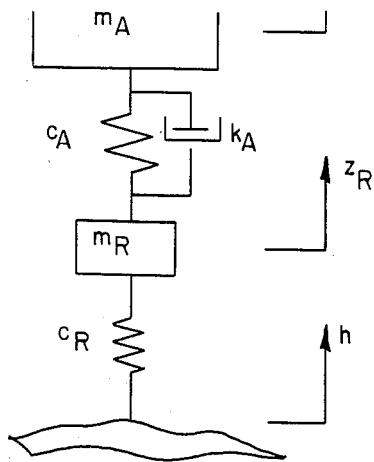
FIG. 1 shows a two-mass system which represents a model of a vehicle.

With reference to FIG. 1, a vehicle is schematically represented in a simplified manner as a two-mass system comprising a body mass $m_A$ and a wheel or axle mass $m_R$. In this arrangement, a spring having a spring constant $c_A$ and a parallel damper or shock absorber having a damping resistance $k_A$ are arranged between body mass $m_A$ and wheel mass $m_R$. Wheel mass $m_R$ is elastically supported with respect to the ground below by a tire, which is represented by the tire spring having a spring constant $c_R$. Road surface unevenness or undulations are, for purposes of this application, defined as having a height h with respect to a reference plane. Body mass $m_A$ and wheel mass $m_R$ are positioned a vertical distance $z_A$ and $z_R$, respectively, from this reference plane.

The following holds for the forces acting on the body and on body mass $m_A$:

$$m_A \ddot{z}_A + k_A(\dot{z}_A - \dot{z}_R) + c_A(z_A - z_R) = 0 \quad (I)$$

The following holds for the forces acting on the wheels and on wheel mass $m_R$:

$$m_R \ddot{z}_R - k_A(\dot{z}_A - \dot{z}_R) - c_A(z_A - z_R) + c_R z_R = c_R h \quad (II)$$

By adding equations I and II and solving for h, the following result is obtained for the height of road surface irregularities:

$$h = z_R + (m_A \ddot{z}_A + m_R \ddot{z}_R)/c_R \quad (III)$$

Height h can be correspondingly determined from body acceleration $\ddot{z}_A$ and wheel acceleration $\ddot{z}_R$, and it should be noted that the distance $z_R$ between wheel mass $m_R$ and the reference plane can be determined by double integration of the wheel acceleration $\ddot{z}_R$ over time, as follows:

$$z_R = \iint \ddot{z}_R dt^2 \quad (IV)$$

If h is represented as a function of time t, a curve is formed which can be described as an additive superimposition of vibrations of different frequency and phase relationship, or as an additive superimposition of sinusoidal curves of different wavelength and phase relationship.

Three frequency ranges of primary interest, relative to the excitation of vehicle vibrations, can then be identified from the function h(t), namely:

0.5–20 Hz, which includes axle and body resonance frequencies;

0.5–2 Hz, which includes the body resonance frequency; and 8.0–20 Hz, which includes the axle resonance frequency.

The root-mean-square values H of the heights h are separately determined for these three frequency ranges. These root-mean-square values are formed exponentially with a freely selectable averaging period $T_m$, as follows:

$$H_{ti} = \sqrt{h_{ti}^2\left(1 - e^{-\frac{\Delta t}{T_m}}\right) + H_{t(i-1)}^2 e^{-\frac{\Delta t}{T_m}}} \quad (V)$$

where $t_i$ are sequential points in time separated by intervals of, for example, $\Delta t = 10$ ms for a sampling frequency of 100 Hz. This form of exponential averaging is advantageous because the values sampled last in each case are more heavily weighted in the process of forming the mean or average value. The mean value is thus always current and corresponds closely to the instantaneous road profile in a readily reproducible manner. The mean value thus has a distinctly better relationship to the instantaneous road profile than in the alternative case of linear averaging.

Figure 2:
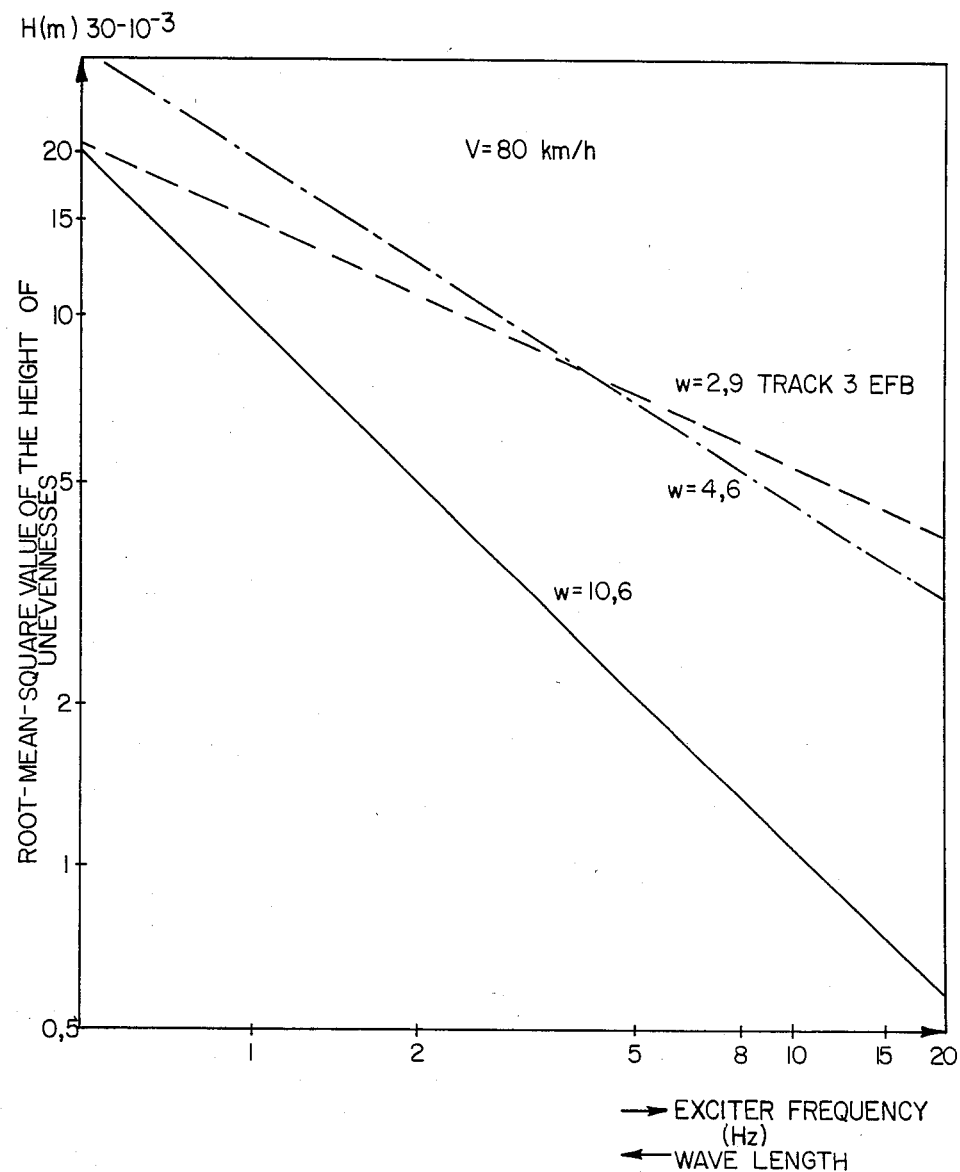
FIG. 2 shows a diagram which represents, in a simplified manner, the relationship between the average height of road surface unevennesses and the exciter frequency or wavelength of the unevennesses.

With reference to FIG. 2, the root-mean-square values H of the road-surface irregularities form straight line curves if they are graphically represented as a function of the exciter frequency or wavelength of the road undulations, if a double logarithmic scale is used. This is indicative of the presence, in the spectrum of road surface irregularities, of long-wave irregularities of greater amplitudes than short-wave irregularities.

FIG. 2 shows the relationships for three arbitrarily chosen road surfaces and the spectra of irregularities which are represented by one of the straight lines in each case. In this arrangement, each line can be represented in an unambiguous manner by two quantities, the root-mean-square value for the frequency range between 0.5 and 20 Hz and the measure of waviness w which is defined as the quotient of the root-mean-square value of the road-surface irregularities in the frequency band between 0.5 and 2 Hz and the root-mean-square value of the road-surface unevennesses in the frequency band between 8 and 20 Hz. The measure of waviness w graphically corresponds to the slope of the lines in FIG. 2. The measure of waviness w characterizes the relationship existing between the excitement of the body and axle resonances at the respective driving speed and the respective profile of road surface irregularities. Advantageously, the speed of the vehicle does not need to be separately determined since road surface irregularities are identified with differing wavelengths within the respective frequency band, depending on speed.

Figure 3:
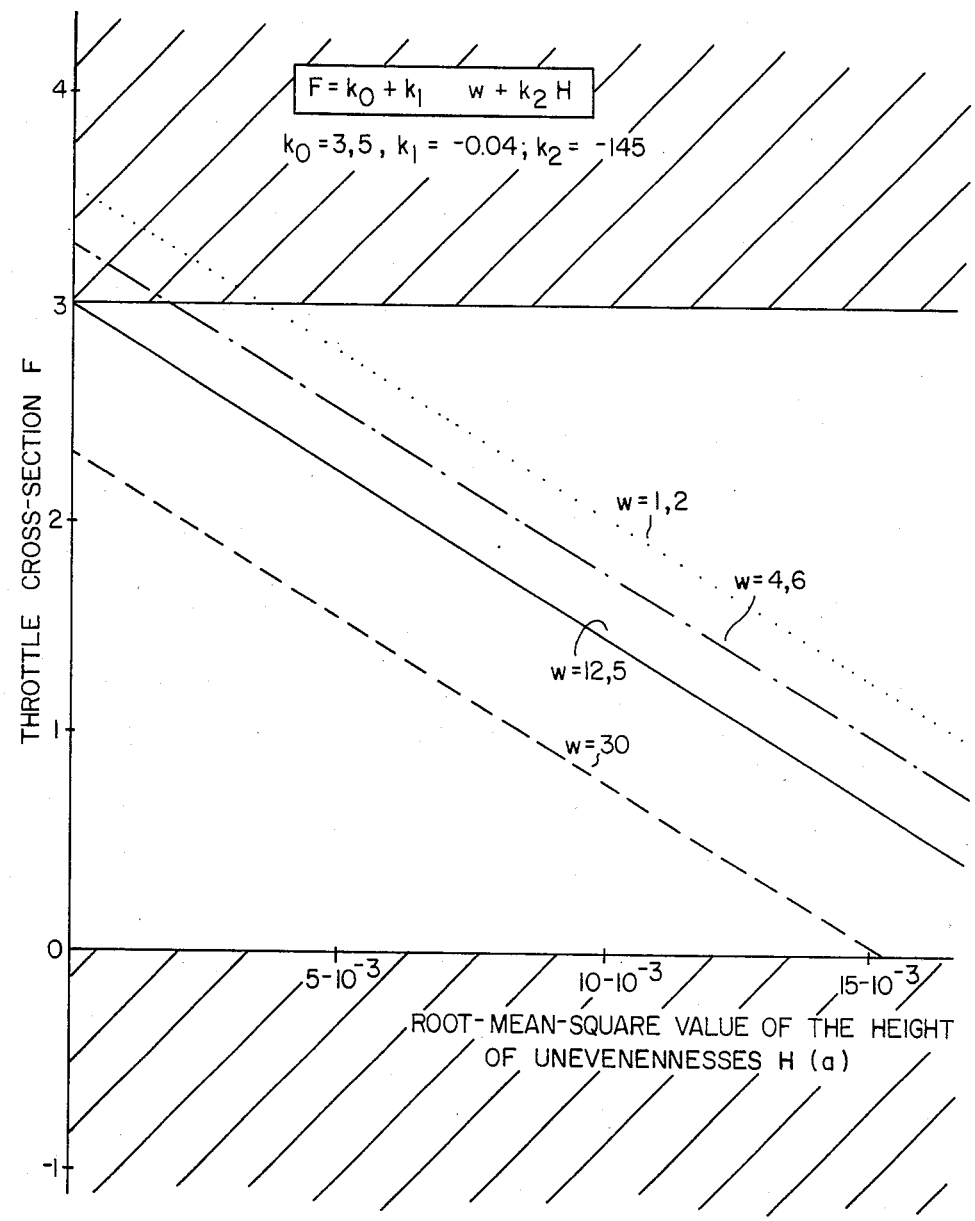
FIG. 3 shows a graph which illustrates the relationship of the bypass throttle cross-section as a function of the root-mean-square value of the height of the road-surface irregularities and the waviness.
Figure 4:
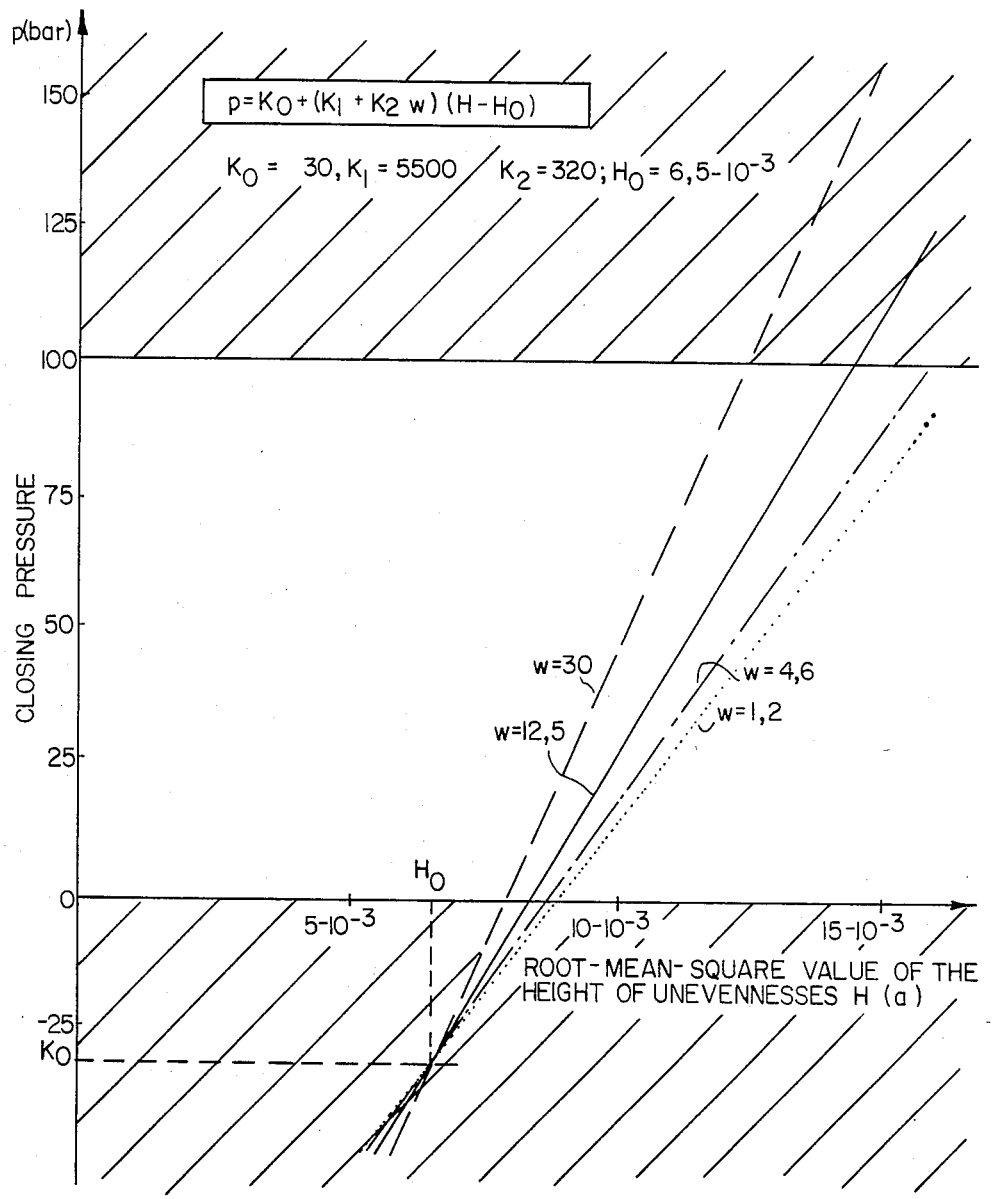
FIG. 4 shows a graph which illustrates the relationship of the closing pressure of the bypass valves as a function of the root-mean-square value of the height of the road-surface irregularities and the waviness.

FIGS. 3 and 4 show the appropriate settings of the throttle cross-section F and closing pressure P of the vehicle shock absorbers as a function of the root-mean-square value H of the height of the road-surface irregularities, and as a function of the measure of waviness w. In this regard, it has been found in actual tests that in each case a linear relationship between shock absorber settings and the root-mean-square values of the height of unevennesses leads to the subjectively best results.

Figure 5:
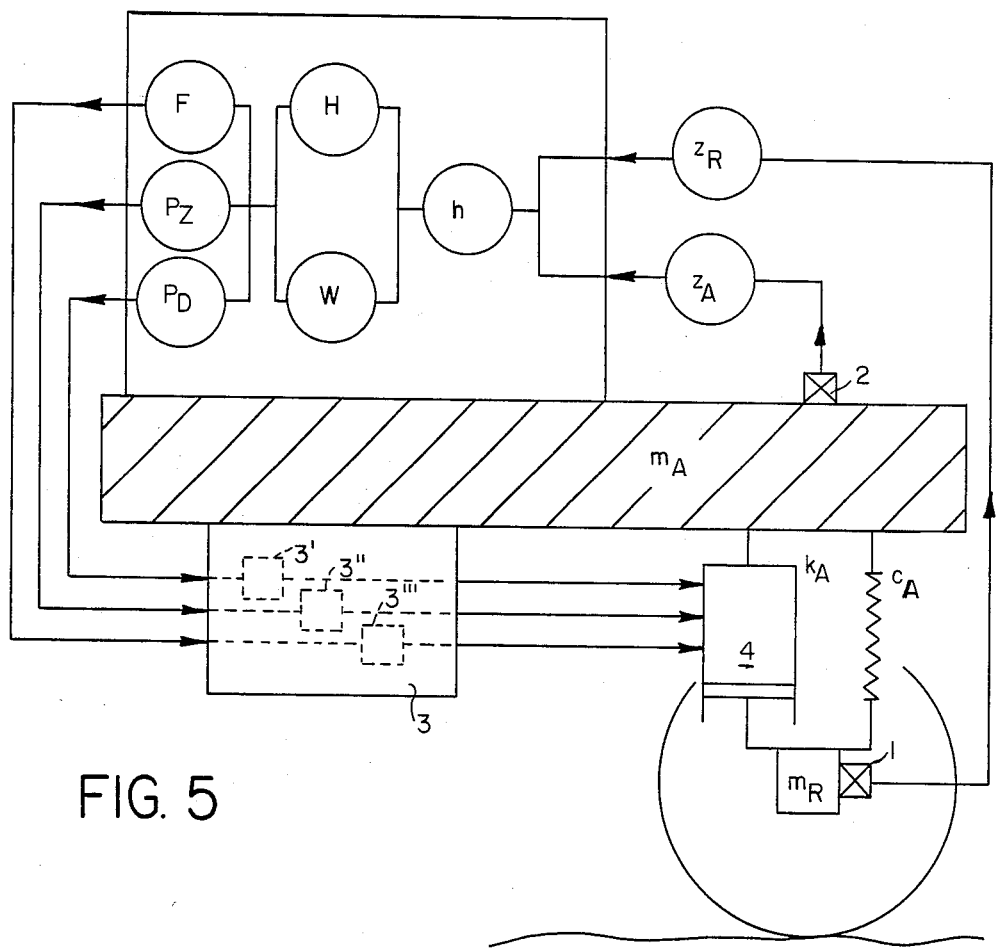
FIG. 5 shows a schematic diagram of a vehicle which includes shock absorber control apparatus according to the present invention.

To implement the above, an acceleration sensor 1 is arranged at the front axle of a vehicle, which is supported with respect to the vehicle body by means of a suspension system having the spring constant $c_A$, and an acceleration sensor 2 is arranged in the front area of the vehicle body, to pick up the wheel acceleration $\ddot{z}_R$ and the body acceleration $\ddot{z}_A$ as functions of time t (see FIG. 5). The resulting signals are then processed by means of the digital circuitry described below into actuating signals for hydraulic control system 3 (depicted schematically), in such a manner that the damping resistance $k_A$ of shock absorber 4 is matched to the particular road-surface conditions, in that an output signal F controls a throttle cross-section and output signals $P_Z$ and $P_D$ control closing pressures under tensile and compressive loads of a throttle and valve arrangement in the bypass of the shock absorber. The dashed blocks (3', 3'' and 3''') of control system 3 are intended to schematically represent conventional processing elements which may be required for interfacing signals F, $P_Z$ and $P_D$ with the control elements of shock absorber 4.

Figure 6:
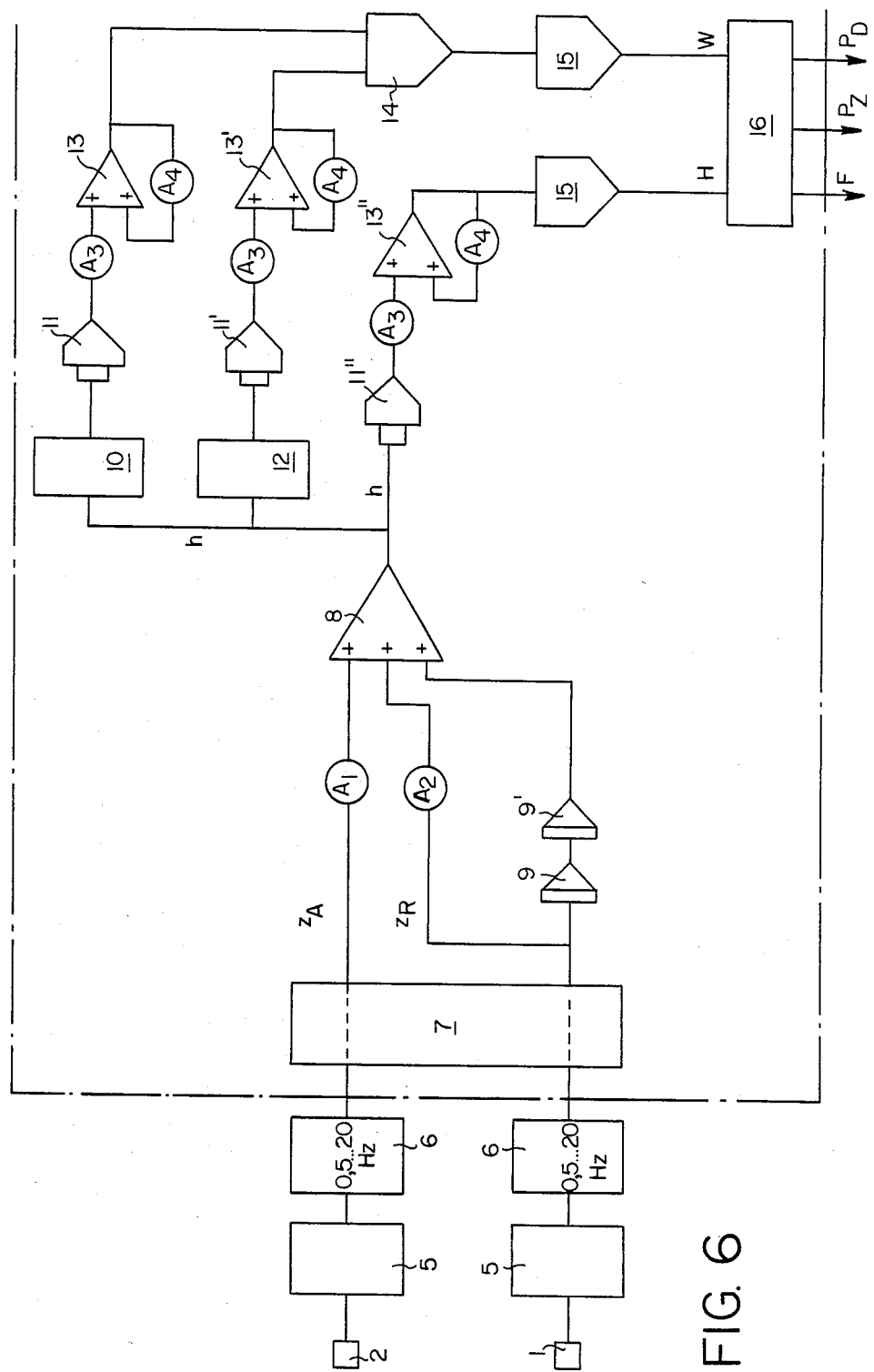
FIG. 6 shows a circuit arrangement for generating signals representative of the average value of the height of road surface undulations and of the ratio between long-wave and short-wave undulations.

FIG. 6 shows a digital circuit arrangement for generating signals H and w as a function of the output signals of acceleration sensors 1 and 2. Signals H and w are representative of the root-mean-square value of the height of the road-surface unevennesses and the measure of waviness defined above, respectively.

The output signals of acceleration sensors 1 and 2 are each connected by an amplifier 5 and a band-pass filter 6, which passes frequencies between 0.5 and about 20 Hz, to an analog/digital converter 7, so that the previously analog signals are converted to digitized form. From analog/digital converter 7, signal $\ddot{z}_A$, which corresponds to the body acceleration, is connected to an input of a summing amplifier 8 by an input resistance $A_1 = m_A/c_R$. Signal $\ddot{z}_R$ which represents the wheel acceleration, is connected to a second input of summing amplifier 8 by another input resistance $A_2 = m_R/c_R$, and to a series circuit consisting of two integrating amplifiers 9 and 9' so that a signal corresponding to the distance $z_R$ between the wheel and the reference plane is present at the output of the last integrating amplifier 9'. Accordingly, a signal h corresponding to the respective height of undulations of the road surface is present at the output of summing amplifier 8 at any time t.

Signal h is supplied to three parallel circuit branches, including a low-pass filter 10 and a squaring amplifier 11, a high-pass filter 12 and a squaring amplifier 11', and directly to a squaring amplifier 11''.

The output of each squaring amplifier 11, 11' and 11'' is connected by an input resistance $A_3 = 1 - \exp(-\Delta t/T_m)$ to an input of respective summing amplifiers 13, 13' and 13'', the output of each of which is fed back to the other input by a feedback resistance $A_4 = \exp(-\Delta t/T_m)$.

Therefore, signals are obtained at the output of the summing amplifiers 13, 13' and 13'', which correspond to the squares of the mean values, as specified in equation V, of the height of road-surface irregularities. In this context, the output of summing amplifier 13 represents the frequency range for irregularities which excite the body resonance, while the output of summing amplifier 13' represents the range of frequencies which excite the axle resonance. At the output of summing amplifier 13'', a signal representative of the heights of road-surface unevennesses averaged over the total spectrum of unevennesses (within the frequency band of 0.5 to 20 Hz) is present.

The outputs of summing amplifiers 13 and 13' are connected to the inputs of a dividing amplifier 14, at the output of which a signal corresponding to the square of the measure of waviness w is correspondingly generated. The output signals of summing amplifier 13" and of dividing amplifier 14 are connected to root-extracting amplifiers 15. The outputs of amplifiers 15 are connected to a decoding circuit 16 which generates, in accordance with the relationships shown in FIGS. 3 and 4, the output signals F, $P_Z$ and $P_D$ which are then used for controlling shock absorbers 4, in accordance with FIG. 5.

Figure 7:
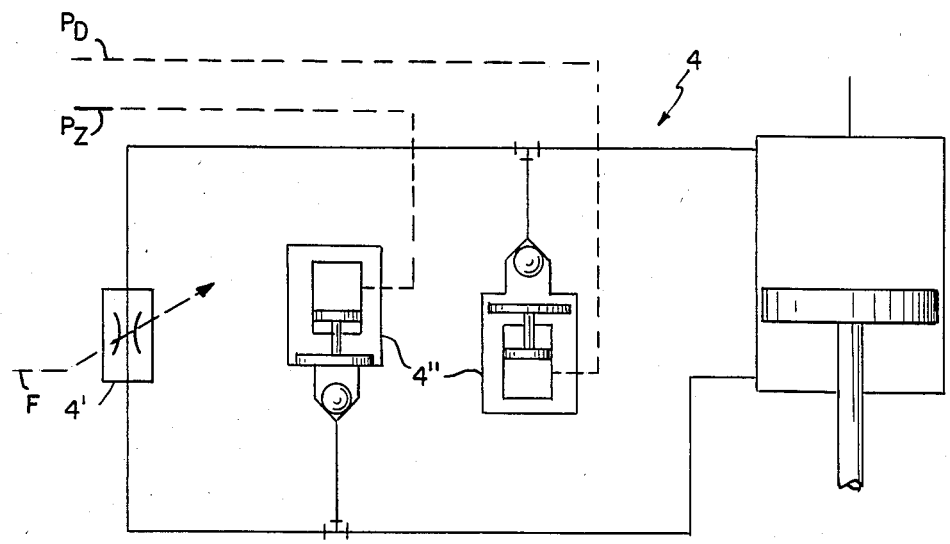
FIG. 7 shows a controllable throttle/valve arrangement in a bypass of a shock absorber.

Control elements 3', 3", and 3'" represent conventional elements. For example, a comparator can serve as element 3'" to compare signal F with fixed voltages associated with respective throttle cross sections of an adjustable throttle 4' in the bypass of shock absorber 4 (see FIG. 7). Elements 3' and 3" can be voltage/pressure transducers which convert electrical signals $P_D$ and $P_Z$ into corresponding hydraulic control pressures which are applied to positioning cylinders of controllable valves 4" in the shock absorber bypass.

As an alternative to the embodiment shown in FIG. 6, summing amplifiers 13, 13' and 13" can also be provided with different input and feedback resistances $A_3$, $A_{3*}$ and $A_{3**}$ and $A_4$, $A_{4*}$ and $A_{4**}$ so that the mean values are in each case formed over different averaging periods $T_m$, $T_{m*}$ and $T_{m**}$ (cf. equation V).

The remainder of the inventive arrangement can also be implemented in digital technology, instead of the analog technology shown, which may be preferred with regard to the reproducibility of results under changing environmental conditions.

One distinctive advantage of the invention lies in the fact that, with very little constructional effort, damping is achieved which is optimally adapted to the respective road-surface profile and to the respective driving speed.

The output signals of the acceleration sensors at the axle and at the body contain accurate information on the respective road surface which is utilized by the invention. The spectral composition of the output signals change with driving speed, i.e., irregularities with a predetermined positional wavelength result in output signals of different frequencies for different driving speeds. Since, according to the preferred embodiment of the invention, low and high frequencies are separately processed by means of the high-pass and low-pass filters, the fact that road-surface unevennesses with different positional wavelengths and, as a rule, different heights, lead to vibrations within the range of the axle or body resonance, depending on driving speed, is necessarily taken into consideration.

Critical driving maneuvers such as, for example, abrupt steering or braking maneuvers, are also necessarily taken into consideration since these maneuvers produce signals such as are generated by pronounced road-surface irregularities which lead to vibrations within the range of the body resonance. Correspondingly, the damping stiffens in critical situations or when pitching or rocking movements of the body occur.

Filters 7, 10 and 12 shown in FIGG. 6 can be constructed as shown on page 9 of German Offenlegungsschrift No. 3,316,011.

From the preceding description of the preferred embodiments, it is evident that the objects of the invention are attained, and although the invention has been described and illustrated in detail, it is to be clearly understood that the same is by way of limitation. The spirit and scope of the invention are to be limited only by the terms of the appended claims.

What is claimed is:

1. Apparatus for controlling of a vehicle suspension system in response to road surface conditions, comprising:

sensor means, mounted on the vehicle, for producing electrical signals representative of road surface undulations;

circuit means, connected to the sensor means, for receiving the electrical signals from the sensor means and for processing these signals to produce control signals representative of the average heights of the road surface undulations;

damping means for damping vibrations in the vehicle suspension system, said damping means having at least two chambers which communicate via a controllable bypass, wherein one of said chambers becomes smaller during compression of the suspension system and another of said chambers becomes smaller during expansion of the suspension system, said damping means having at least one of a controllable throttle and a controllable valve in said bypass; and means for connecting the control signals produced by the circuit means to the controllable bypass, and for controlling the bypass with said signals;

wherein, the circuit means produces a first control signal (H) which is representative of the average height of the overall road surface undulations, and a second control signal (w) which is representative of a ratio of average heights for long-wave and short-wave undulations, and wherein said circuit means further processes the first and second control signals to produce at least one of a third control signal (F) for controlling the controllable throttle and a fourth signal (P) for controlling the controllable valve, in accordance with the following relationships:

$$P = a_0 + a_1 H + a_2 w + a_3 Hw$$

$$F = b_0 + b_1 H + b_2 w + b_3 Hw$$

where, $a_0 - a_3$ and $b_0 - b_3$ are predetermined constants.

2. Apparatus according to claim 1, wherein said sensor means comprises a first sensor arranged at a vehicle wheel support or axle and a second sensor arranged on a vehicle body supported by the vehicle suspension system, and wherein said circuit means comprises means for combining the signals produced by said sensors to generate a signal representative of the height (h) of road surface undulations over which the vehicle has passed, and means for processing said signal (h) to produce the first and second control signals (H and w).

3. Apparatus according to claim 2, wherein said means for combining the signals produced by the sensors to generate the signal (h) comprises means for summing said first and second signals with one another and with a second integral of said first signal.

4. Apparatus according to claim 2, wherein said means for processing the signal (h) to produce the first control signal (H) includes means for exponentially averaging the signal (h) over a selected time internal.

5. Apparatus according to claim 4, wherein said means for exponentially averaging the signal (h) includes squaring means having an input for receiving the signal (h) and an output connected by a first resistance to a first input of a summing device, said summing device having an output and a second input which are connected by a second resistance which is larger than said first resistance, and root-extracting means having an input connected to the output of the summing device.

6. Apparatus according to claim 2, wherein said means for processing the signal (h) to produce the second control signal (w) includes high-pass filter means for passing relatively high-frequency components of the signal (h) and low-pass filter means for passing relatively low-frequency components of the signal (h), and means for exponentially averaging the high-frequency components over a first selected time interval and for exponentially averaging the low-frequency components over a second selected time interval, and means for forming a ratio of said averaged high- and low-frequency components.

7. Apparatus according to claim 6, wherein each of said means for exponentially averaging the high-frequency and low-frequency components of the signal (h) includes squaring means having an input for receiving the respective component of the signal (h) and an output connected by a first resistance to a first input of a summing device, said summing device having an output and a second input which are connected by a second resistance which is larger than said first resistance, and root-extracting means having an input connected to the output of the summing device.

8. Apparatus according to claim 7, wherein the means for forming the ratio of the averaged high- and low-frequency components is connected between the respective summing device and the root-extracting means.

9. Apparatus according to claim 2, wherein said first sensor is arranged at a front vehicle wheel support or axle.

10. Apparatus according to claim 2, wherein said first sensor is arranged in close proximity to at least one of a right and left front wheel of the vehicle.

11. Apparatus according to claim 2, wherein said second sensor is arranged in a front area of the vehicle.

* * * * *